United States Patent [19]

Ichihara et al.

[11] Patent Number: 4,782,477
[45] Date of Patent: Nov. 1, 1988

[54] OPTICAL RECORDING MEDIUM WITH FLUORINE RESIN ADHESIVE

[75] Inventors: Katsutarou Ichihara, Tokyo; Yoshiaki Terashima, Yokosuka; Nobuaki Yasuda, Zushi; Akio Hori, Kawasaki, all of Japan

[73] Assignee: Kabushiki Kaisha Toshiba, Kawasaki, Japan

[21] Appl. No.: 903,487

[22] Filed: Sep. 4, 1986

[30] Foreign Application Priority Data

Sep. 30, 1985 [JP] Japan ................................ 60-214519
Mar. 6, 1986 [JP] Japan ................................ 61-47338

[51] Int. Cl.$^4$ .......................... G11B 7/24; G11B 11/12
[52] U.S. Cl. ...................................... 369/275; 369/13; 369/284; 369/286; 369/288; 346/766; 346/135.1; 430/945; 524/544
[58] Field of Search ................. 369/13, 275, 284, 286, 369/288; 430/945; 427/412.5; 428/63, 64, 65, 62, 40, 43; 423/301; 346/135.1, 76 L; 524/544, 545, 546; 156/333

[56] References Cited

U.S. PATENT DOCUMENTS

| | | | |
|---|---|---|---|
| 4,133,798 | 1/1979 | Nishimura et al. | 524/545 |
| 4,390,600 | 6/1983 | Ohta et al. | |
| 4,565,772 | 1/1986 | Takeoka et al. | 428/64 |
| 4,578,788 | 3/1986 | Ahn et al. | 369/275 |
| 4,580,790 | 4/1986 | Doose | 524/546 |
| 4,635,076 | 1/1987 | Willson et al. | 430/945 |
| 4,670,322 | 6/1987 | Nakamura et al. | |

FOREIGN PATENT DOCUMENTS

| | | |
|---|---|---|
| 0123223 | 10/1984 | European Pat. Off. . |
| 0139474 | 5/1985 | European Pat. Off. . |
| 0161807 | 11/1985 | European Pat. Off. . |
| 2497994 | 7/1982 | France . |
| 47-34747 | 9/1974 | Japan ................................ 524/546 |
| 59-65950 | 4/1984 | Japan ................................ 369/284 |
| 60-79543 | 7/1985 | Japan . |
| 61-32238 | 2/1986 | Japan ................................ 369/284 |
| 61-32237 | 2/1986 | Japan ................................ 369/284 |
| 61-292239 | 12/1986 | Japan ................................ 369/284 |
| 0711096 | 1/1980 | U.S.S.R. ............................ 524/546 |
| 1391610 | 4/1975 | United Kingdom ............... 524/546 |

OTHER PUBLICATIONS

Patents Abstracts of Japan, vol. 8, No. 208, (P-302) [1645], Sep. 21, 1984.
Patents Abstracts of Japan, vol. 10, No. 60, (P-435) [2117], Mar. 11, 1986.
Patents Abstracts of Japan, vol. 8, No. 204, (p-301), 9/18/84.
Patents Abstracts of Japan, vol. 9, No. 109, (p-355), 5/14/85.
Topical Meeting on Optical Data Storage, Washington, D.C., pp. TUAA3-1-TUAA3-4, K. Taira et al., 15-17 Oct. 1985, "Magneto-Optic Erasable Disc Memory With Two Optical Heads".

Primary Examiner—Raymond F. Cardillo
Assistant Examiner—Hoa T. Nguyen
Attorney, Agent, or Firm—Oblon, Fisher, Spivak, McClelland & Maier

[57] ABSTRACT

A magneto-optical recording disk has a transparent resinous substrate with a pre-groove, and a metallic recording layer formed above the substrate. A transparent adhesive layer is provided between the substrate and the recording layer, for allowing a laser beam to pass therethrough, and for causing the recording layer to be tightly adhered to the substrate to thereby prevent the recording layer from being peeled off from the substrate. The adhesive layer is comprised of a fluorine resin material.

19 Claims, 7 Drawing Sheets

OPTICAL RECORDING MEDIUM WITH FLUORINE RESIN ADHESIVE

BACKGROUND OF THE INVENTION

The present invention relates to optical recording media and in particular, to a magneto-optical recording medium having a recording layer formed on a transparent resin substrate through which a light beam is introduced to the recording layer.

Recently, considerable effort has been given to the development of optical recording media. Such recording media offer an advantage over conventional magnetic tapes or disks in that they can store data information at high recording density to provide very large storage capabilities.

A disk-shaped optical recording disk of the type known as an optical disk or diskette can include a metallic recording layer which is formed on a transparent substrate with a pre-groove. The substrate requires a minimum birefringence to reduce the noise level of a light signal, as well as its transparency for light beam transmission. In order to meet such requirements and allow easy formation of the pre-groove in the substrate, a transparent resin material (e.g., polymethyl methacrylate, polycarbonate, epoxy, and the like) is preferred as the substrate material.

The above transparent resin material, however, has poor adhesive properties with a metal or metallic compound constituting a recording layer. Therefore, it is difficult to form a metallic recording layer on the transparent resin substrate. This is a serious obstacle to practical application of an optical disk. In particular, in a magneto-optical disk as one of the most promising optical recording media, this problem is more serious. This is since a magneto-optical disk adopts a rare earth-transision metal amorphous ferrimagnetic film (to be referred to as an "RE-TM film" hereinafter) as a recording layer, and the RE-TM film has poor adhesive properties with respect to the resin substrate. This problem is most urgent in the development of magneto-optical disks.

In order to solve the above problem, according to Japanese Patent Disclosure (KOKAI) No. 60-79543, an adhesive layer consisting of a polymer layer is formed between the recording layer and the transparent resin substrate to adhere them. The adhesive layer is deposited on the substrate with a pre-groove by a spin-coat method using a wet process (formation of the pre-groove after that of the adhesive layer is not practical in the manufacture of the optical disk).

However, if the wet process is adopted, it becomes very difficult to uniformly deposit the adhesive layer on the entire surface of the substrate having the pregroove. The thickness of the adhesive layer varies widely on the wall portions of the pre-groove, and becomes nonuniform on the bottom portion thereof. As a result, the deposited adhesive layer cannot satisfactorily transform a sectional shape of the pre-groove. Therefore, the pre-groove defined on the adhesive layer is deformed, thus degrading fundamental data read/write control characteristics of the optical disk (e.g., tracking, focusing, and random-access). In the proposed optical disk with the pre-groove, if the adhesive properties between the recording layer and the substrate are to be improved, this may degrade fundamental characteristics of the disk. Thus, the optical disk proposed in the above disclosure is not the solution to the above problem.

SUMMARY OF THE INVENTION

It is therefore an object of the present invention to provide a new and improved optical recording medium with a pre-groove in which a recording layer can be tightly adhered to a substrate without degrading fundamental optical characteristics thereof.

In accordance with the above object, the present invention is addressed to a specific recording medium which includes a resinous substrate with a pre-groove. The substrate is transparent so as to allow a radiation beam to pass therethrough. Above the substrate a metallic recording layer is formed which changes its optical characteristic in an area onto which the radiation beam is focused, to thereby store binary data. A transparent adhesive layer is provided between the substrate and the recording layer, for allowing the radiation beam to pass therethrough. The adhesive layer adheres the recording layer to the substrate to prevent the recording layer from being peeled off therefrom. The adhesive layer comprises a fluorine resin material, which can be formed by a known dry process formation, such as sputtering or plasma polymerization. Using these film formation techniques, the adhesive layer can be uniformly disposed on the substrate with the pre-groove, so that the recess shape of the pre-groove can be well inherited (succeeded) to the adhesive layer to prevent the degradation of tracking control of the optical disk due to the formation of the adhesive layer.

The invention, and its objects and advantages, will become more apparent in the detailed description of preferred embodiments presented below.

BRIEF DESCRIPTION OF THE DRAWINGS

In the detailed description of a preferred embodiment of the invention presented below, reference is made to the accompanying drawings in which.

DETAILED DESCRIPTION OF THE PREFERRED EMBODIMENTS

Figure 1:
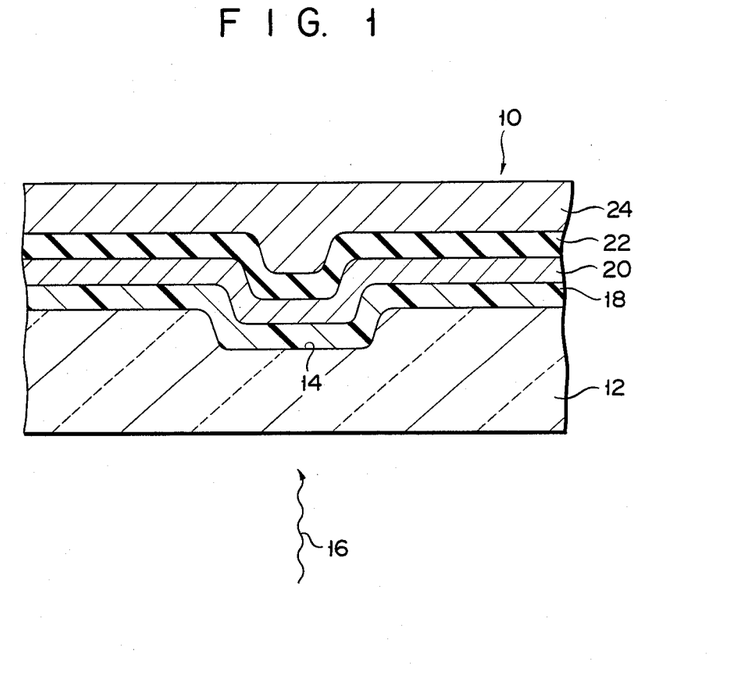
FIG. 1 shows a sectional view of a disk-shaped magneto-optical recording medium having an adhesive layer provided between a substrate and a recording layer in accordance with one preferred embodiment of the invention not drawn to scale.

There is shown in FIG. 1 of the drawings a data-erasable disk-shaped magneto-optical recording medium, which is designated generally by the numeral 10. This recording medium (referred to as "magneto-optical disk" or "optical disk" hereinafter) 10 has a transparent resinous substrate 12 on which is formed a guide groove 14 known as "pre-groove" among those skilled in the art. The pre-groove 14 may be a plurality of concentric grooves or a spiral groove. Substrate 12 comprises a transparent resin material (e.g., polycarbonate) to allow data read/write radiation beam 16 (indicated by the wavy arrow in FIG. 1) to pass therethrough. Substrate 12 can also comprise a transparent resin material such as polymethyl methacrylate, epoxy, or the like.

Adhesive layer 18 and recording layer 20, which is made of a rare earth-transition metal amorphous ferrimagnetic alloy thin film (RE-TM film), are sequentially deposited on the surface of substrate 12 on which pre-groove 14 is formed. In this embodiment, recording layer 20 comprises, e.g., a terbium-cobalt (Tb-Co) film, and adhesive layer 18 comprises a transparent insulative layer containing a fluorine resin. Since adhesive layer 18 is also transparent as is substrate 12, data read/write beam 16 passes through substrate 12 and adhesive layer 18, and is guided to Tb-Co recording layer 20.

Although the composition ratio of the fluorine resin in adhesive layer 18 can be uniform in its entire region, it is more preferable that the composition ratio is increased gradually or stepwise from Tb-Co recording layer 20 toward substrate 12. In this case, if an average composition ratio in the entire region of layer 18 is given by $x'$, composition ratio $x$ of the fluorine resin component in adhesive layer 18 varies along the direction of thickness of layer 18 to satisfy the following relation:

(1) in the interface region with substrate 12
$x > x'$ (2) in the interface region with layer 20
$x < x'$ When the fluorine resin component is distributed in adhesive layer 18 to satisfy the above relations, a peel-off prevention effect of recording layer 20 from substrate 12 can be enhanced. In this way, upon control of the distribution of the fluorine resin component, the reliability of an optical disk under severe environmental conditions (e.g., high temperature and high humidity) can be improved.

Interference layer 22 and light reflection layer 24 are sequentially formed on Tb-Co recording layer 20. Interference layer 22 comprises an insulative layer (e.g., $Si_3N_4$), and light reflection layer 24 comprises a metal layer (e.g., aluminum). Laser beam 16 radiated onto recording layer 20 through substrate 12 and adhesive layer 18 is effectively reflected by reflection layer 24.

Figure 2:
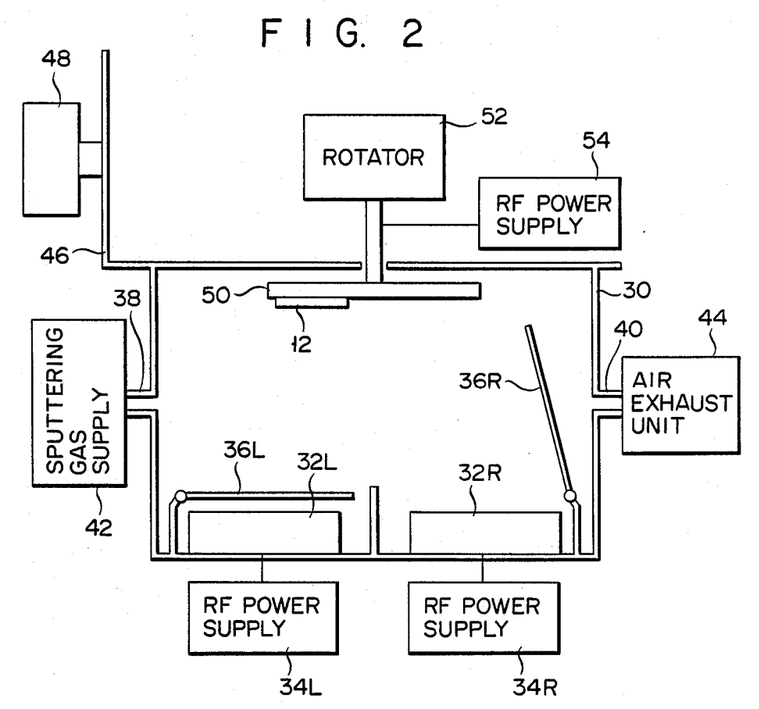
FIG. 2 shows a sputtering apparatus used for forming a multi-layered structure of the recording layer and the adhesive layer on the substrate in the production of the magneto-optical recording medium of FIG. 1 and drawn to an enlarged scale.

FIG. 2 shows a schematic arrangement of a sputtering apparatus used when the optical disk having the multi-layered structure is manufactured. Sputter chamber 30 has a plurality of, e.g., four, magnetron sputter sources 32 therein. FIG. 2 illustrates only two sputter sources 32L and 32R for the sake of simplicity. The suffixes L and R stand for left and right and will be used for other elements as well. Where it is not necessary to distinguish between left and right, the suffixes may be dropped. Sputter sources 32L and 32R are arranged on the bottom portion of sputter chamber 30, and are respectively connected to RF power supplies 34L and 34R, arranged outside chamber 30. Shutters 36L and 36R can be opened or closed so as to cover sputter sources 32L and 32R, respectively.

Sputter chamber 30 has sputter gas supply port 38 and sputter gas exhaust port 40 in its wall portion. Ports 38 and 40 are respectively coupled to sputter gas supply unit 42 and air exhaust unit 44. Prior to sputtering, sputter chamber 30 is evacuated by unit 44 to an appropriate vacuum. Thereafter, a sputter gas necessary for sputtering is supplied to sputter chamber 30 by gas supply unit 42.

Upper wall unit 46 is arranged on the upper portion of sputter chamber 30 to be vertically movable. Upper wall unit 46 is vertically moved by known elevator mechanism 48. When unit 46 reaches its lowermost position, it closes the upper opening of sputter chamber 30, as shown in FIG. 2, thus sealing the internal space of chamber 30 from its exterior. Sputter chamber 30 has a table-like rotatable substrate holder 50. Substrate 12 of an optical disk to be sputtered, is placed and fixed on the lower surface of holder 50. Holder 50 is coupled to rotator 52 through a rotating shaft, and is electrically connected to RF power supply 54. When substrate 12 of the optical disk to be sputtered is placed on the lower surface of holder 50, upper wall unit 46 is driven upward by elevator 48, and the substrate is mounted while the upper opening of sputter chamber 30 is kept open.

The present inventors prepared optical disks having the fundamental multi-layered structure shown in FIG. 1 using the sputtering apparatus shown in FIG. 2. Four examples will be described below.

EXAMPLE 1

An optical disk having the structure in FIG. 1 was produced using the sputtering apparatus shown in FIG. 2 in the following manner. A polycarbonate substrate with a pre-groove having a diameter of 120 mm and a thickness of 1.2 mm was used as transparent resin substrate 12. First, a stamper was prepared from a master disk obtained by exposing and developing a photopolymer by an Ar-ion laser, and then a polycarbonate resin was injection-molded using the stamper. Substrate 12 obtained was subjected to ultrasonic cleaning in a neutral detergent solution for 5 minutes, and was then washed with pure water. After $N_2$ blow drying and desiccator drying, the substrate was placed into sputter chamber 30 and was fixed to holder 50 by screws, as shown in FIG. 2. Elevator 48 was driven to move unit 46 downward, thus sealing sputter chamber 30. Thereafter, exhaust unit 44 was driven to evacuate sputter chamber 30 to a pressure of $5 \times 10^{-6}$ Torr, and 99.999% purity Ar gas was supplied to chamber 30 from gas supply unit 42, thus maintaining the gas pressure in chamber 30 at $5\times10^{-3}$ Torr. Next, holder 50 was rotated at 60 rpm by rotator 52, and 150-W RF power was applied to sputter source 32L (which stored a 5-inch tetrafluoroethylene target) from power supply 34L while one (36L) of shutters 36 was closed. Pre-sputter (sputter with one closed shutter 36) was performed for 5 minutes to clean the target surface. Thereafter, shutter 36L was opened and sputter film formation was performed for about 20 minutes. Then, power supply 34L was turned off, and sputter chamber 30 was released to the outer atmosphere. Unit 46 was moved upward by elevator 48 and substrate 12, on which adhesive layer 18 comprising fluoroethylene was formed, was removed from chamber 30. Using glass, polymethyl methacrylate, polycarbonate, and epoxy samples (about 15 mm×25 mm) placed on holder 50 at the same time, the film qualities of adhesive layers formed by the above method were evaluated. As a result, the film thickness was 100 nm, a transmittance was 93% (wavelength 830 nm, polymethyl methacrylate substrate), and a chemical resistance was high such that no change in properties was found after a 30-min acetone ultrasonic cleaning. The adhesive property of the adhesive layer with respect to the substrate was strong such that no film was peeled off from any of the polymethyl methacrylate, polycarbonate, epoxy, and glass substrates in a peel-off test using an adhesive tape. In addition, after four cycles of accelerated degradation tests, each cycle including 24-Hr. aging under high-temperature, high-humidity atmosphere (at a temperature of 65° C. and a humidity of 90%R.H.) and 1-Hr. aging under ambient atmosphere, the resultant adhesive layer was not peeled off from any of the above four substrates, and no change in properties (e.g., a change in transmittance) of the fluoroethylene film itself was found.

As Comparative Example 1, an $Si_3N_4$ underlying layer was formed in place of adhesive layer 18. $N_2$-Ar gas mixture containing $N_2$ at 3% partial pressure was used as the sputter gas, RF power applied to an Si target was 300 W, and a film formation duration was 20 minutes. When the thus obtained $Si_3N_4$ underlying layer was evaluated in the same manner as the adhesive layer of the fluoroethylene film, the film thickness was 100 nm, the transmittance was 91%, and no changes in properties was found after 30-min acetone ultrasonic cleaning. As for the adhesive property with respect to the substrate, the layer was not peeled off when it was formed on the glass substrate, and it was easily peeled off from the polymethacrylate, polyimide, or epoxy resin substrate. After four cycles of the same accelerated degradation tests as above, no peel-off of the $Si_3N_4$ underlying layer was found, only when it was formed on the glass substrate, and $Si_3N_4$ layers formed on the other resin substrates were locally peeled off therefrom (10-μm wide wrinkles were formed), resulting in degradation in transmittance.

Next, Si, Tb, Co, and Al targets were arranged in four sputter sources 32 shown in FIG. 2, and recording layer 20 of a Tb-Co film, interference layer 22 of an $Si_3N_4$ film, light reflection layer 24 of an Al film were formed with the same batch on a polycarbonate substrate on which adhesive layer 18 was formed and on a polycarbonate substrate on which the $Si_3N_4$ underlying layer as Comparative Example was formed. Each of these two substrates was fixed to holder 50 by screws in sputtering apparatus shown in FIG. 2, and unit 46 was moved downward. Sputter chamber 30 was evacuated to $5\times10^{-6}$ Torr by exhaust unit 44, and 99.999% purity Ar gas was supplied in chamber 30 by gas supply unit 42, thus maintaining the gas pressure in chamber 30 at $5\times10^{-5}$ Torr. Thereafter, RF power supply 54 was turned on to apply 300-W RF power, so that the substrate surface was subjected to 5-min sputter etching processing. Then, the substrates were cleaned.

Next, shutters 36 corresponding to Tb-target and Co-target sputter sources 32 were closed. In this state, pre-sputter was performed for 5 minutes such that DC power was applied to sputter sources 32 from RF power supplies 34, so that discharge currents of 0.5 A and 1.5 A flowed through the Tb and Co targets, respectively, thereby cleaning the target surfaces. Thereafter, holder 50 was rotated at 60 rpm by rotator 52. Shutters 36 corresponding to Tb-target and Co-target sputter sources 32 were simultaneously opened, and Tb-Co film formation was performed for 35 seconds. As a result, recording layer 20 comprising a 35-nm thick Tb-Co film was formed on each substrate. Thereafter, power supplies 34 were turned off.

Next, the sputter gas was changed to a $N_2$-Ar gas mixture containing $N_2$ at 3% partial pressure, and 300-W RF power was applied to Si-target sputter source 32 from the corresponding power supply 34, thereby performing pre-sputter for 5 minutes. After 5-min sputter film formation, interference layer 22 comprising a 25-nm thick $Si_3N_4$ layer was formed on recording layer 20.

Next, the sputter gas was changed to pure Ar gas, and 300-W RF power was applied to Al-target sputter source 32 from corresponding power supply 34, thus performing pre-sputter for 5 minutes. After a 10-min sputter film formation, light reflection film 24 comprising a 100-nm thick Al film was formed on interference layer 22 comprising the $Si_3N_4$ film. Thereafter, power supply 34 was turned off, and rotation of substrates 12 was stopped. Sputter chamber 30 was released to ambient pressure, substrates 12 were moved upward by unit 46, and the optical disks shown in FIG. 1 were removed from chamber 30.

Meanwhile, using glass, polymethyl methacrylate, polycarbonate, and epoxy samples each having the adhesive layer of a 100-nm fluoroethylene film, and similar samples each having a 100-nm $Si_3N_4$ film, which were placed on holder 50 at the same time, their characteristics immediately after film formation were evaluated. More specifically, reflectivity R and Kerr rotation angle $\theta k$ were measured by irradiating the substrate surfaces with He-Ne laser beam. As a result, in the samples in which the fluoroethylene adhesive layer was formed on the polymethyl methacrylate substrate, R=20% and $\theta k$=0.45 deg. In the samples having the $Si_3N_4$ film, R=25% and $\theta k$=0.45 deg. In the structure of the present invention having the fluoroethylene adhesive layer, it was confirmed that a reproduction characteristic index (product of $R\times\theta k$) high enough for practical applications could be obtained.

Figure 3A:
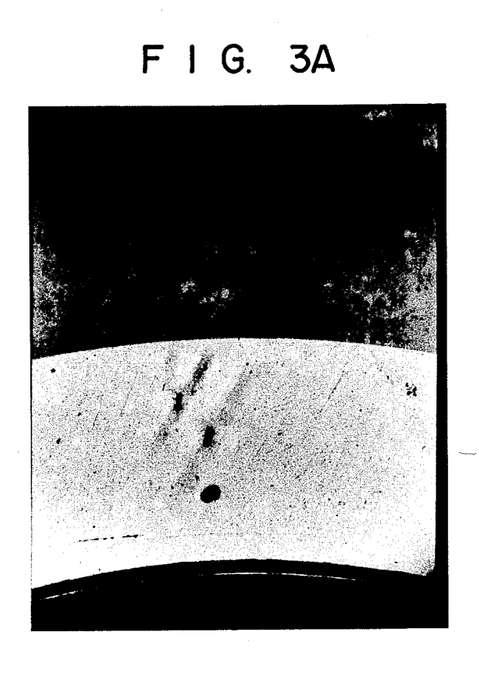
FIGS. 3A and 3B are photomicrographs showing the structural compositions of metal surface of magneto-optical recording disks after the performance of an accelerated degradation test, the magneto-optical recording disks each having a transparent adhesive layer made by a sputtering method.
Figure 3B:
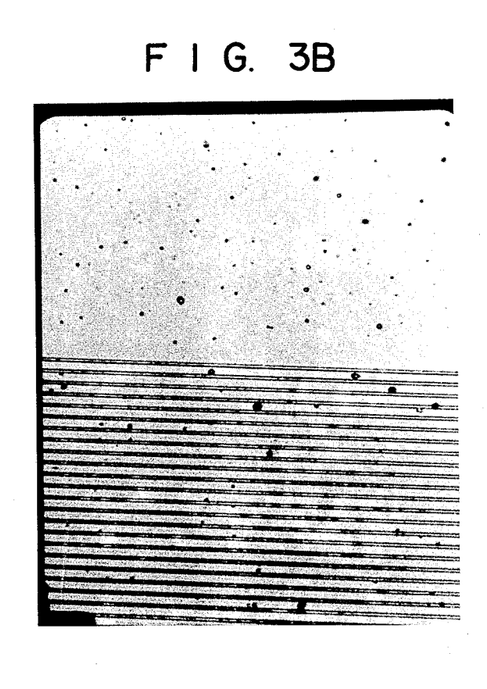

In the peel-off test using the adhesive tape, in the samples having the fluoroethylene adhesive layer, no peel-off occurred in any of glass, polymethyl methacrylate, polycarbonate, and epoxy substrates. In contrast to this, in the samples having the $Si_3N_4$ underlying layer, peel-off occurred except for the glass substrate. These samples and an optical disk using a polycarbonate substrate with a pre-groove having a diameter of 120 mm were subjected to the accelerated degradation tests in which 24-Hr. aging at a temperature of 65° C. and a humidity of 90%R.H., 1-Hr. aging at ambient temperature, and 48-Hr. aging at a temperature of 65° C. and a humidity of 90%R.H. were repeated, thus examining the occurrence of peel-off. FIGS. 3A and 3B show photomicrographs of metal compositions showing the surface conditions of the optical disk of the present invention after the accelerated degradation test. FIG. 3A is a photomicrograph at a magnification of 10 times, and FIG. 3B is a photomicrograph at a magnification of 1,000 times. As can be seen from FIGS. 3A and 3B, no peel-off occurred on both the surfaces with and without a pre-groove (stripe portions). In contrast to this, in the conventional optical disk having the $Si_3N_4$ underlying layer, the film was peeled off from the substrate during the accelerated degradation test. As can also be seen from the photomicrographs in FIGS. 3A and 3B, the shape of the pregroove could be kept unchanged without deformation.

EXAMPLE 2

Figure 4:
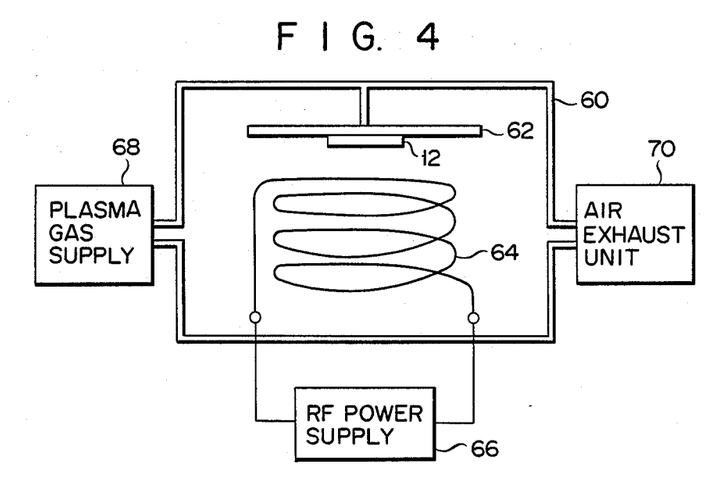
FIG. 4 shows a plasma polymerization apparatus used for forming the adhesive layer on the substrate in another example of the production of the magneto-optical recording medium of FIG. 1 and drawn to an enlarged scale.

In Example 1, the fluoroethylene adhesive layer was formed by a sputtering method. However, the fluoroethylene adhesive layer can be obtained by a method wherein Freon gas is plasma-polymerized. FIG. 4 shows a plasma polymerization apparatus applied to formation of the fluoroethylene adhesive layer. Referring to FIG. 4, reference numeral 60 denotes a polymerization chamber; and 62, a substrate holder for holding resin substrate 12 (e.g., polymethyl methacrylate substrate with a pregroove having a diameter of 120 mm). Reference numeral 64 denotes a coil; 66, an RF power supply; 68, a plasma gas supply unit; and 70, an exhaust unit.

Using the above plasma polymerization apparatus, a fluoroethylene adhesive layer was formed in the following manner. First, polymerization chamber 60 was evacuated to $5 \times 10^{-8}$ Torr by exhaust unit 70. Thereafter, 10 sccm of $CF_4$ gas and 10 sccm of Ar gas were simultaneously supplied to chamber 60 from gas supply unit 68. RF power supply 66 was turned on, and 200-W RF power was then applied to coil 64. $CF_4$-Ar gas mixture plasma was excited in chamber 60, and plasma polymerization film formation on substrate 12 was performed for 30 minutes. Thereafter, substrate 12 was removed from chamber 60. As for the film quality of the resultant plasma polymerized fluoroethylene film, although the chemical resistance was slightly lower than that of the sputter fluoroethylene film, other properties were as good as those of the sputter fluoroethylene film. A recording layer of a Tb-Co film, an interference layer of an $Si_3N_4$ film, and a light reflection layer of an Al film were sequentially formed on the plasma polymerized fluoroethylene film using the sputtering apparatus shown in FIG. 2, and the resultant multilayer was subjected to the accelerated degradation test as in Example 1. As a result, no peel-off of the films occurred and no degradation in the shape of the pre-groove was found.

EXAMPLE 3

In Examples 1 and 2, the adhesive layer was formed only of a fluorine resin (fluoroethylene). The adhesive layer of the present invention can contain an inorganic material having a transparency in addition to the fluorine resin.

As transparent resin substrate 12, the same polycarbonate substrate with a pre-groove as in Example 1 was prepared. The substrate was subjected to ultrasonic cleaning in a neutral detergent solution for 5 minutes, and was washed with pure water. Thereafter, $N_2$ blow drying and desiccator drying were performed. The cleaned substrate was fed into sputter chamber 30 of the sputtering apparatus shown in FIG. 2, and was fixed to substrate holder 50 by screws. Unit 46 was moved downward to seal sputter chamber 30. Exhaust unit 44 was driven to evacuate sputter chamber 30 to $5 \times 10^{-5}$ Torr. Thereafter, $N_2$-Ar gas mixture containing $N_2$ at 3% partial pressure was supplied to sputter chamber 30 from gas supply unit 42 to maintain the gas pressure inside chamber 30 at $5 \times 10^{-3}$ Torr. Next, holders 50 was rotated at 60 rpm, and 150-W RF power and 120-W RF power were applied to sputter sources 32 (respectively storing 5-inch tetrafluoroethylene and Si targets) from the corresponding power supplies 34 while two shutters 36 above the corresponding sputter sources 32 were closed. Pre-sputter (sputter with two shutters 36 closed) was performed for 5 minutes, thus cleaning the target surfaces. Next, two shutters 36 were opened, and sputter film formation was performed for about 10 minutes. Thereafter, power supplies 34 were turned off, and sputter chamber 30 was released to ambient pressure. Unit 46 was moved upward and substrate 12 on which adhesive layer 18 comprising fluoroethylene 75 vol. %-$Si_3N_4$ 25 vol. % was removed from chamber 30. Using glass, polymethyl methacrylate, polycarbonate, and epoxy samples (about 15 mm × 25 mm) placed on holder 50 at the same time, the film quality of adhesive layer 18 formed thereon was evaluated. As a result, the film thickness was 100 nm, the transistance was 91% (wavelength 830 nm, polymethyl methacrylate substrate), and the chemical resistance was high such that no changes in properties were found after a 30-min acetone ultrasonic cleaning. The adhesive property of the adhesive layer with respect to the substrate was also high such that no film was peeled from any of the polymethyl methacrylate, polycarbonate, epoxy, and glass substrates in the peel-off test using an adhesive tape. In addition, after four cycles of accelerated degradation test, each cycle including 24-Hr. aging under high-temperature, high-humidity atmosphere (at a temperature of 65° C. and a humidity of 90%R.H.) and 1-Hr. aging under ambient atmosphere, no film was peeled off from any of the four substrates, and no change in properties (e.g., a change in transmittance) of the fluoroethylene film itself was found.

According to the present invention, if the adhesive layer comprises a mixture of the fluorine resin and an inorganic material, substantially the same effect as with the fluorine resin can be obtained.

EXAMPLE 4

In Example 3, the adhesive layer comprising the mixture of fluoroethylene and $Si_3N_4$ has a constant composition ratio of fluoroethylene (i.e., 75 vol. %). However, after the repeated accelerated degradation tests for a long period of time under severer conditions, the present inventors found that the reliability could be improved when the composition ratio of the fluorine resin varied along the direction of thickness of the adhesive layer of this type. In this case, in order to reduce differences in thermal expansion ratios and water absorption expansion coefficients between the adhesive layer, the substrate and the recording layer are as small as possible, composition ratio x of the fluorine resin is varied so as to satisfy the following relations:
at the substrate side, $x > x'$
at the recording layer side, $x < x'$ where x' is an average value of x along the direction of the thickness.

Figure 5A:
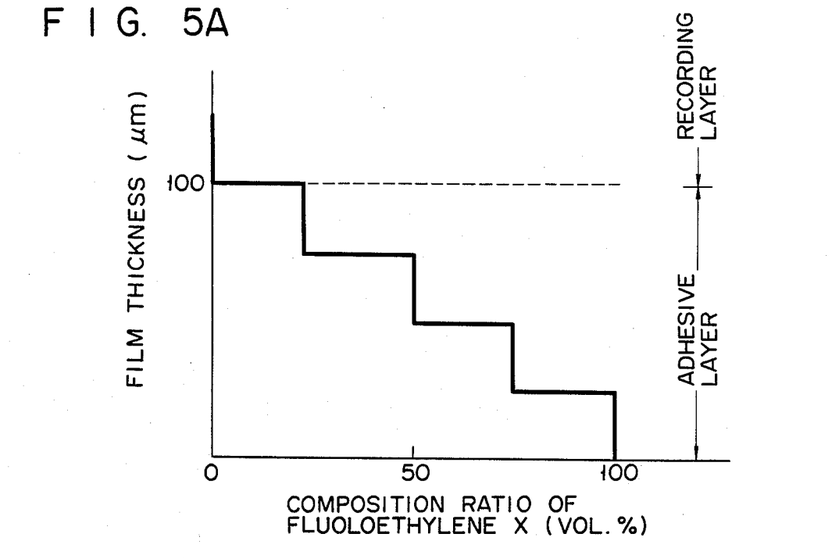
FIGS. 5A and 5B are graphs showing the variations of the composition ratio of fluoroethylene in the transparent adhesive layer of the magneto-optical recording disk, along the perpendicular direction to the layer surface.
Figure 5B:
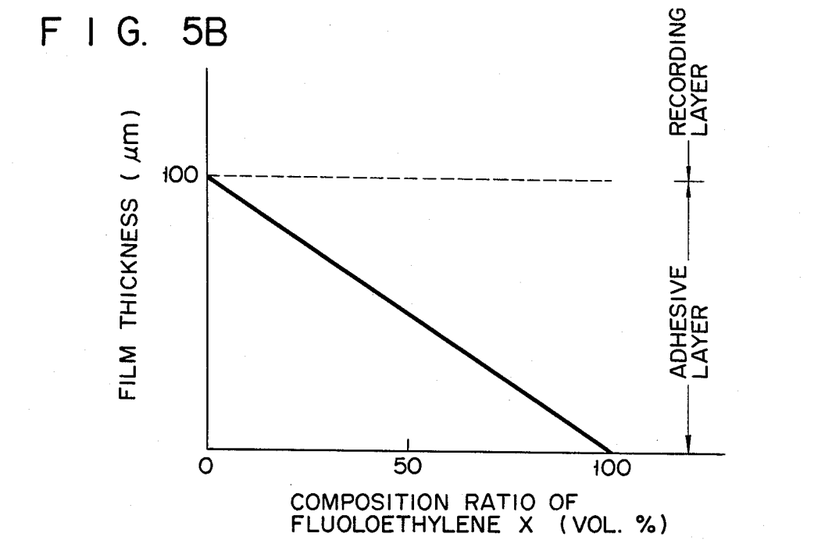

FIGS. 5A and 5B are graphs when the composition ratio of the fluorine resin is varied along the direction of thickness of the adhesive layer, in which, FIG. 5A shows a case in which the composition ratio is varied stepwise and FIG. 5B shows a case in which the composition ratio varies gradually. The adhesive layers, the composition ratios of which were varied as shown in FIGS. 5A and 5B, could be formed by changing, over time, an input power ratio to the tetrafluoroethylene target and the Si target in the sputtering apparatus shown in FIG. 2. A recording layer of a Tb-Co film, an interference layer of an $Si_3N_4$ film, and a light reflection layer of an Al film were sequentially formed on these adhesive layers in the same manner as in Example 3 to prepare optical disks. The optical disks were subjected to the accelerated degradation test, together with the optical disk in Example 3 having the adhesive layer comprising the mixture of fluoroethylene and $Si_3N_4$ and having the constant composition ratio of fluoroethylene (i.e., 75 vol. %), under severer conditions than those of Example 3. In the test, four cycles of 24-Hr. aging at a temperature of 80° C. and a humidity of 90%R.H., 1-Hr aging at ambient temperature, and 96-Hr. aging at a temperature of 80° C. and a humidity of 90%H.R. were repeated.

Figure 6A:
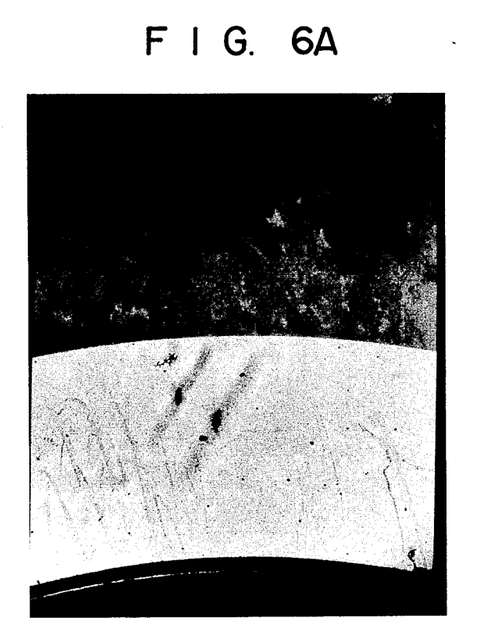
FIGS. 6A and 6B are photomicrographs showing the structural compositions of metal surface of magneto-optical recording disks after the performance of an accelerated degradation test, the magneto-optical recording disks each having a transparent adhesive layer in which the composition ratio of tetrafluoroethylene is varied along a perpendicular direction to the layer surface.
Figure 6B:
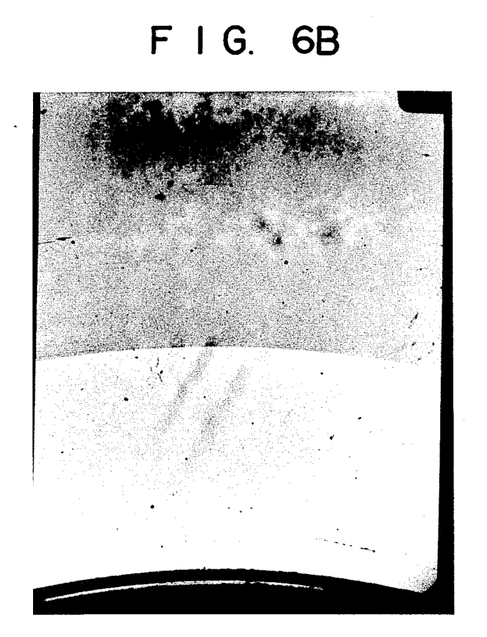
Figure 7A:
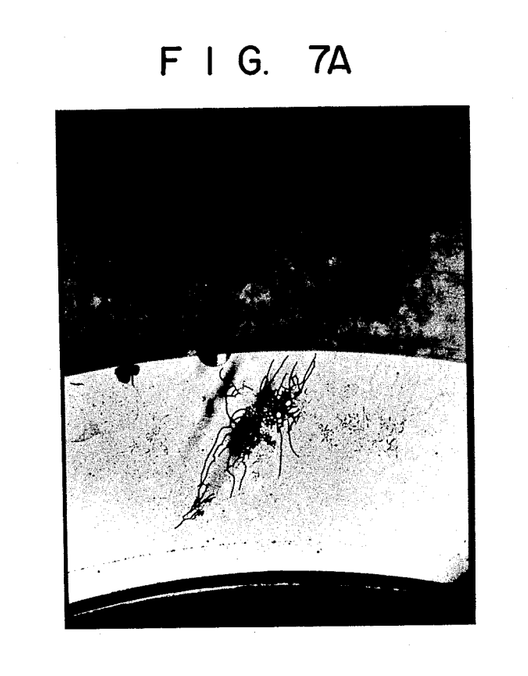
FIGS. 7A and 7B are photomicrographs showing the structural compositions of metal surface of magneto-optical recording disks after the performance of an accelerated degradation test, the magneto-optical recording disks each having a transparent adhesive layer in which fluoroethylene is uniformly contained.
Figure 7B:
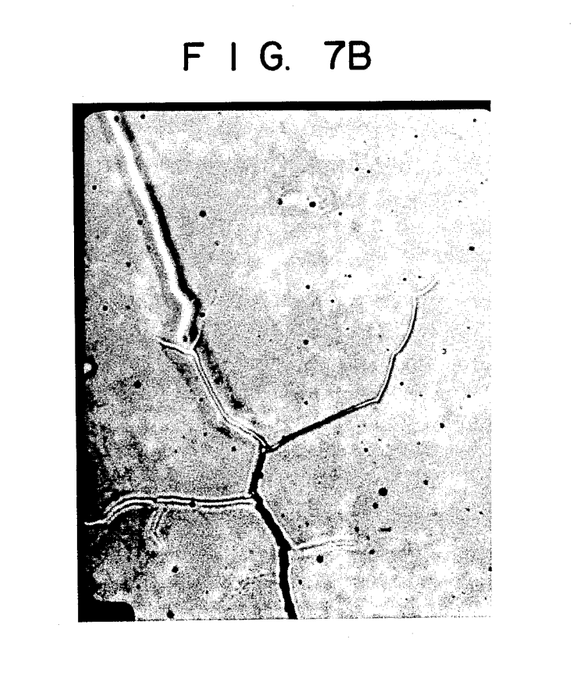

FIGS. 6A and 6B and FIGS. 7A and 7B are photomicrographs of metal textures showing the surface conditions of the optical disks after the accelerated degradation test. FIG. 6A shows the surface condition of the optical disk having the adhesive layer with a stepwise change in composition ratio shown in FIG. 5A, FIG. 6B shows the surface condition of the optical disk having the adhesive layer with a gradual change in composition ratio shown in FIG. 5B, and FIGS. 7A and 7B show the surface condition of the optical disk having the adhesive layer, in which the composition ratio of fluoroethylene is constant (i.e., 75 vol. %). FIGS. 6A and 6B and FIG. 7A are photomicrographs at a magnification of 10 times, and FIG. 7B is a photomicrograph at a magnification of 1,000 times.

The optical disk having the constant fluoroethylene composition ratio exhibited no peel-off in the accelerated degradation test performed under the conditions at a temperature of 65° C. and a humidity of 90%R.H. as in Example 3. However, as can be seen from FIGS. 7A and 7B, stripe-like peel-off occurred locally in the optical disk of Example 3 during the longer accelerated degradation test at a temperature of 80° C. and a humidity of 90%R.H. in Example 4. The similar phenomenon was observed in the optical disk in Example 1, in which the adhesive layer was comprised of only fluoroethylene.

In contrast to this, in the optical disk having the adhesive layer with the stepwise change in composition ratio, peel-off was found only on a surface without the pre-groove, as shown in FIG. 6A. In the optical disk having the adhesive layer having the gradual change in composition ratio, no peel-off was found, as shown in FIG. 6B. Therefore, a sufficiently high reliability can be expected for the adhesive layer having the uniform composition ratio under ambient atmosphere (e.g., in an office). However, if optical disks need be stored under severe conditions for a long period of time, the adhesive layer, in which the composition ratio of the fluorine resin is varied along the direction of thickness of the adhesive layer, can provide higher reliability.

When an adhesive layer having a stepwise change in composition ratio shown in FIG. 5B and including a 100% fluoroethylene layer, is to be formed, the 100% fluoroethylene layer can be formed by a plasma polymerization method using $CF_4$ gas. A layer of fluoroethylene and an inorganic material can be formed by simultaneously performing plasma polymerization using $CF_4$ gas and sputter of the inorganic material target. However, this complicates manufacturing conditions. Therefore, simultaneous sputter of the tetrafluoroethylene and inorganic material targets is preferred.

According to the optical disk of the present invention described in the above examples, transparent adhesive layer 18 comprising a fluorine resin is provided between substrate 12 with pre-groove 14 and Tb-Co recording layer 20 in order to improve the adhesive properties therebetween. Since adhesive layer 18 is transparent as is substrate 12, it can improve the adhesive properties between recording layer 20 and substrate 12 without degrading fundamental optical characteristics of a magneto-optical recording disk, such as a beam reflectance, Kerr hysteresis characteristics, and the like, thus improving the reliability of the optical disk.

Since adhesive layer 18 can be formed by a dry process (e.g., a sputtering method or a plasma polymerization method), it can be uniformly deposited on substrate 12 to accurately reproduce the small sectional shape of pre-groove 14 formed on substrate 12. The small sectional shape of pre-groove 14 can be satisfactorily duplicated by recording layer 20, and the fundamental data read/write control characteristics (e.g., tracking, focusing, rondom-access, and the like) of the optical disk with the pre-groove can thus be improved.

Figure 8:
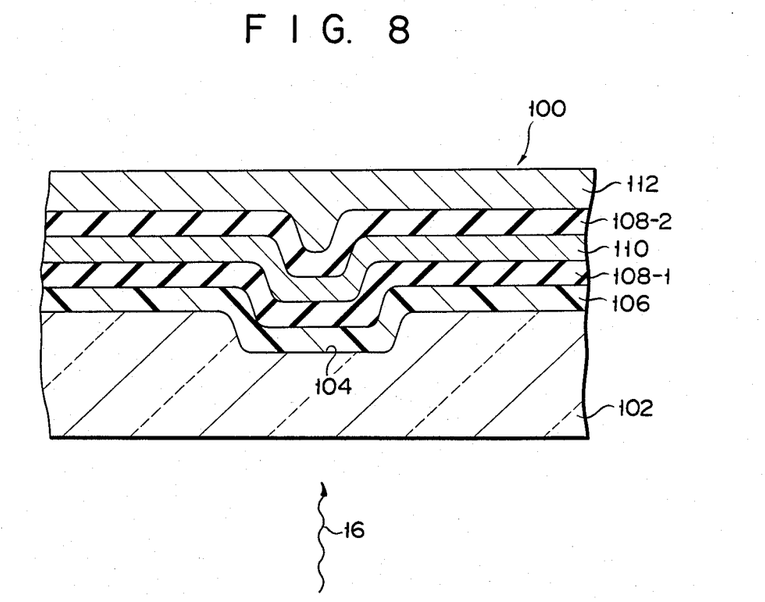
FIG. 8 shows a sectional view of a disk-shaped magneto-optical recording medium having an adhesive layer provided between a substrate and a recording layer in accordance with another embodiment of the invention not drawn to scale.

Magneto-optical disk 100 according to another embodiment of the present invention will now be described with reference to FIG. 8. Referring to FIG. 8, laser beam 16 incident on the optical disk is represented by the wavy arrow in the same manner as in FIG. 1. Disk-shaped substrate 102 comprises a transparent resin material (e.g., polycarbonate) in the same manner as in the previous embodiment shown in FIG. 1, and has pre-groove 104. Transparent adhesive layer 106 and transparent first protective layer 108-1 are sequentially deposited on the surface of substrate 102 on which pre-groove 104 is formed. Adhesive layer 106 comprises a transparent insulative film containing a fluorine resin in the same manner as in the previous embodiment. In this embodiment, adhesive layer 106 contains fluoroethylene as the fluorine resin. First protective layer 108-1 comprises a transparent inorganic dielectric, e.g., $Si_3N_4$.

Deposited on first protective layer 108-1 are recording layer 110 comprising a rare earth-transition metal amorphous ferrimagnetic metal film such as a Tb-Co film, second protective layer 108-2, and light reflection layer 112 comprising a metal film (e.g., an aluminum film) having a high reflectivity. The composition of second protective layer 108-2 is the same as that of first protective layer 108-1. Tb-Co recording layer 110 is sandwiched between first and second protective layers 108-1 and 108-2 in order to prevent it from being oxidized since a magneto-optical recording medium is very sensitive to oxidization. The optical disk having the above structure can also be manufactured by a sputtering method using the sputtering apparatus shown in FIG. 2, or by a plasma polymerization method using the plasma polymerization apparatus shown in FIG. 4.

It should be noted that adhesive layer 106 can comprise:

(1) a 100% fluorine resin (i.e., a resin material having C-F bonds);
(2) a homogeneous mixture of a fluorine resin and an inorganic dielectric; or
(3) a mixture of a fluorine resin and an inorganic dielectric, in which the composition ratio of the fluorine resin in adhesive layer 106 increases gradually or stepwise from recording layer 110 toward substrate 102 along the direction of thickness of adhesive layer 106.

Formation of such adhesive layer 106 can be realized by: (1) sputtering a tetrafluoroethylene target; (2) simultaneously sputtering a tetrafluoroethylene target and an inorganic dielectric target; or (3) plasma-polymerizing Freon gas.

The present inventors manufactured optical disks having the multi-layered structure shown in FIG. 8, using the sputtering apparatus in FIG. 2. Some examples will be described below.

EXAMPLE 5

A magneto-optical recording disk having transparent adhesive layer 106 and first and second protective layers 108-1 and 108-2, sandwiching recording layer 110 therebetween were manufactured in basically the same manner as in Example 1. Transparent adhesive layer 106 and recording layer 110 were formed in the same steps as in Example 1.

After adhesive layer 106 was formed on substrate 102 with pre-groove 104, Si, Tb, Co, and Al targets are placed in four sputter sources 32 in FIG. 2. A polycarbonate substrate with adhesive layer 106 and another polycarbonate substrate without layer 106, as a comparative example, were fixed to substrate holder 50 in order to form thereon first protective layer 108-1 of an $Si_3N_4$ film film, recording layer 110 of a Tb-Co film, second protective layer 108-2 of an $Si_3N_4$ film, and light reflection layer 112 of an Al film. Next, upper wall unit 46 was moved downward and sputter chamber 30 was evacuated to $5 \times 10^{-6}$ Torr by exhaust unit 44. Thereafter, $N_2$-Ar gas containing $N_2$ at 3% partial pressure was supplied to chamber 30 and the gas pressure in chamber 30 was maintained at $5 \times 10^{-3}$ Torr. Then, 300-W RF power was applied to Si target sputter source 32 from power supply 34, thus performing pre-sputter (target cleaning while closing the corresponding shutter 36) for 5 minutes. Next, the corresponding shutter 36 was opened and formation of an $Si_3N_4$ film was performed by reactive sputtering for 20 minutes, thus forming a 100-nm thick $Si_3N_4$ film (corresponding to first protective layer 108-1) on adhesive layer 106 and substrate 102.

Next, sputter chamber 30 was again evacuated to $5 \times 10^{-8}$ Torr by exhaust unit 44, and 99.999% purity Ar gas was supplied thereto by gas supply unit 42, thus maintaining the gas pressure in chamber 30 at $5 \times 10^{-8}$ Torr. RF power supply 34 was turned on so that the $Si_3N_4$ film surface was cleaned by 5-min sputter etching with 300-W RF power.

Next, DC power was applied to Tb and Co target sputter sources 32 while shutters 36 corresponding thereto were closed, so that 0.5-A and 1.5-A discharge currents respectively flowed through Tb and Co targets, thus performing 5-min pre-sputter. After the target surfaces were cleaned, substrate holder 50 was rotated at 60 rpm by rotator 52 and shutters 36 corresponding to sputter sources 32 were simultaneously opened, thus forming a Tb-Co film for 35 seconds. As a result, recording layer 110 of a 25-nm Tb-Co layer was formed, and power supply 34 was then turned off.

Next, the sputter gas was changed to a $N_2$-Ar gas mixture containing $N_2$ at 3% partial pressure, and 300-W RF power was applied to Si target sputter source 32 from corresponding power supply 34, thus performing presputter for 5 minutes. Thereafter, sputter film formation was performed for 5 minutes, thereby forming a second protective layer 108-2 of a 25-nm thick $Si_3N_4$ film on recording layer 110.

Next, the sputter gas was replaced with pure Ar gas, and 300-W RF power was then applied to Al target sputter source 32 from power supply 34, thus performing pre-sputter for 5 minutes. Thereafter, sputter film formation was performed for 10 minutes, thus forming light reflection layer 112 of a 100-nm thick Al film on protective layer 108-2 of the $Si_3N_4$ film. Power supply 34 was turned off, the rotation of substrates 102 was stopped, and sputter chamber 30 was then released to ambient pressure. Unit 46 was moved upward and optical disks 100 shown in FIG. 8 was removed from chamber 30.

Using glass, polymethyl methacrylate, polycarbonate, and epoxy samples each having an adhesive layer comprising a 100-nm fluoroethylene film and similar samples without an adhesive layer as a comparative example, which were placed on holder 50 at the same time, characteristics immediately after film formation were evaluated. More specifically, reflectivity R and Kerr rotation angle $\theta k$ were measured by irradiating substrate surface with an He-Ne laser beam. As a result, the sample, having the fluoroethylene adhesive layer on the polymethyl methacrylate substrate, had R=20% and $\theta k$=0.45 deg. The sample without the adhesive layer had R=25% and $\theta k$=0.45 deg. With the structure of the present invention having the fluoroethylene adhesive layer, a reproduction characteristic index (product of $R \times \theta k$) high enough for practical applications could be obtained.

In the peel-off test using an adhesive tape, no peel-off occurred in any of the glass, polymethyl methacrylate, polycarbonate, and epoxy substrates having the fluoroethylene adhesive layer. In contrast to this, peel-off occurred in the samples having no adhesive layer, except for the glass substrate. These samples and the 120-mm optical disk with a pre-groove were subjected to the accelerated degradation test, wherein 24-Hr. aging at a temperature of 65° C. and a humidity of 90%R.H., 1-Hr. aging at ambient temperature, and 48-Hr. aging at a temperature of 65° C. and a humidity of 90%R.H. were repeated, and the occurrence of peel-off was examined. FIGS. 3A and 3B show photomicrographs of metal textures showing the surface conditions of the optical disk of the present invention after the accelerated degradation test. FIG. 3A is a photomicrograph at a magnification of 10 times, and FIG. 3B is a photomicrograph at a magnification of 1,000 times. As can be seen from FIGS. 3A and 3B, no peel-off occurred on both the surfaces with and without a pre-groove (stripe portions). In contrast to this, in the conventional optical disk having the $Si_3N_4$ underlying layer, the film was peeled off from the substrate during the accelerated degradation test.

EXAMPLE 6

A magneto-optical recording disk having first and second protective layers 108-1 and 108-2 was prepared by a plasma polymerization method using the apparatus shown in FIG. 4. In this case, first and second protective layers 108-1 and 108-2 could be formed above substrate 102 under substantially the same conditions as the film formation conditions of $Si_3N_4$ interference film in Example 2.

According to the optical disk of the second embodiment of the present invention as described above, the same effect as in first embodiment can be obtained. In addition, with the optical disk of the second embodiment, since protective layer 108-1 without containing a fluorine resin component is provided between adhesive layer 106 and recording layer 110, composition ratio x of the fluorine resin need not be carefully controlled so as not to contain the fluorine resin component in the interface region between adhesive layer 106 and recording layer 110 in the first embodiment (see FIG. 5A). This means that distribution control of the fluorine resin component in adhesive layer 106 can be greatly simplified, and contributes to simplify the manufacture of a pre-groove optical disk having the adhesive layer.

Although the invention has been described with reference to specific embodiments, it shall be understood by those skilled in the art that numerous modifications may be made that are within the spirit and scope of the inventive contribution.

For example, in the above embodiments, the recording layer comprises a Tb-Co film having a magneto-optical effect, but can comprise another RE-TM film. In addition, the adhesive layer of the present invention can be applied to optical disks having recording layers of, e.g., a CuAl film utilizing a shape memory effect, an SeTe film utilizing a change in crystal structure, an InSb film, and the like, and the same effect as in the previous embodiments can be expected.

In the above embodiments, $Si_3N_4$ is exemplified as a transparent inorganic material mixed with a fluorine resin (fluoroethylene). However, other inorganic materials, e.g., $SiO_2$, SiO, AlN, ZnS, $CaF_2$, ITO, and the like can be used as well as $Si_3N_4$, and the same effect can be obtained. In a test, targets of these inorganic materials were subjected to sputter together with a tetrafluoroethylene target to form adhesive layers consisting of mixtures of these materials on polymethyl methacrylate, polycarbonate, epoxy, and glass substrates, and the resultant disks were subjected to a peel-off test as described above. In the disks having the adhesive layer with uniform fluoroethylene composition ratio of 50 vol. % or higher, no film was peeled off from any type of substrate in which the fluoroethylene composition layer was 50 vol. % or more, and no peel-off was found in the adhesive layer having the gradual change in composition ratio.

What is claimed is:

1. An optical recording medium comprising:
   a transparent resinous substrate with a pre-groove, said substrate allowing a radiation beam to pass therethrough;
   a metallic recording layer formed above said substrate, said recording layer changing its optical characteristic in an area on which the radiation beam is focused to form a beam spot; and
   a transparent adhesive layer provided between said substrate and said recording layer, for allowing the radiation beam to pass therethrough, and for causing said recording layer to be adhered to said substrate to prevent said recording layer from being peeled off from said substrate, said adhesive layer comprising a fluorine resin material which is contained therein in such a manner that said adhesive layer is made of pure fluorine resin material at least in the surface region of said adhesive layer which is in contact with said substrate, to thereby maximize the adhesion force between said transparent resinous substrate and said metallic recording layer.

2. The recording medium according to claim 1, wherein said adhesive layer comprises a transparent inorganic layer which is dielectric and in which a fluorine resin component is contained.

3. The recording medium according to claim 2, wherein said fluorine resin component is contained in said transparent inorganic layer in such a manner that a composition ratio of said fluorine resin component is varied along a perpendicular direction thereof.

4. The recording medium according to claim 3, wherein said fluroine resin component is distributed in said transparent inorganic layer in a manner that the composition ratio of said fluorine resin component is larger than an averaged value of the composition ratio of said fluorine resin component in a first interface region between said substrate and said adhesive layer, said composition ratio of said fluorine resin component being smaller than said averaged value in a second interface region between said adhesive layer and said recording layer.

5. The recording medium according to claim 4, wherein the composition ratio of said fluorine resin component is continuously varied in said transparent inorganic layer along the perpendicular direction thereof.

6. The recording medium according to claim 4, wherein the composition ratio of said fluorine resin component is discontinuously varied in said transparent inorganic layer along the perpendicular direction thereof.

7. The recording medium according to claim 4, wherein the composition ratio of said fluorine resin component is set to be substantially zero in said second interface region of said transparent inorganic layer.

8. The recording medium according to claim 5, wherein the composition ratio of said fluorine resin component is set to be substantially zero in said second interface region of said transparent inorganic layer.

9. The recording medium according to claim 6, wherein the composition ratio of said fluorine resin component is set to be substantially zero in said second interface region of said transparent inorganic layer.

10. The recording medium according to claim 4, wherein said recording layer comprises a magneto-optical recording layer.

11. The recording medium according to claim 1, further comprising:
    first and second protective layers provided to sandwich said recording layer, for protecting said recording layer from being oxidized, said recording layer comprising a magneto-optical recording layer of rare-earth-transition metal amorphous ferrimagnetic alloy.

12. The recording medium according to claim 11, wherein said protective layers comprise inorganic dielectric layers which are transparent to allow the radiation beam to pass therethrough.

13. The recording medium according to claim 12, wherein said fluorine resin component is included in said transparent inorganic layer at a constant composition ratio.

14. The recording medium according to claim 12, wherein said transparent inorganic layer is made of fluorine resin material.

15. The recording medium according to claim 12, wherein said adhesive layer comprises a transparent inorganic layer which is dielectric and in which a fluorine resin component is contained.

16. The recording medium according to claim 15, wherein said fluorine resin component is contained in said transparent inorganic layer in such a manner that a composition ratio of said fluorine resin component is varied along a perpendicular direction thereof.

17. The recording medium according to claim 16, wherein said fluorine resin is distributed in said transparent inorganic layer in a manner that the composition ratio of said fluorine resin component is larger than an averaged value of the composition ratio of said fluorine resin component in a first interface region between said substrate and said adhesive layer, said composition ratio of said fluorine resin component being smaller than said averaged value in a second interface region between said adhesive layer and said first protective layer.

18. The recording medium according to claim 17, wherein the composition ratio of said fluorine resin component is continuously varied in said transparent inorganic layer along the perpendicular direction thereof.

19. The recording medium according to claim 17, wherein the composition ratio of said fluorine resin component is discontinuously varied in said transparent inorganic layer along the perpendicular direction thereof.

* * * * *